Patented Dec. 7, 1943

2,336,179

UNITED STATES PATENT OFFICE 2,336,179

QUATERNARY AMMONIUM COMPOUNDS

Friedrich Leuchs, Wuppertal-Elberfeld, Germany, assignor, by mesne assignments, to Winthrop Chemical Company, Inc., New York, N. Y., a corporation of New York No Drawing. Application July 13, 1940, Serial No. 345,373. In Germany June 9, 1939

7 Claims. (Cl. 260—562)

This invention relates to quaternary ammonium compounds which display dispersing, bactericidal and fungicidal properties.

In accordance with the present invention new quaternary ammonium compounds distinguished by a dispersing, disinfecting and preserving action are obtainable by the manufacture of quaternary ammonium compounds of the following general formula

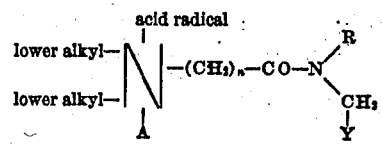

where A is a higher molecular aliphatic hydrocarbon radical having 8–18 carbon atoms, $n$ is one of the integers 1 and 2, R is a member of the class consisting of hydrogen and lower alkyl, and Y is a radical selected from the class consisting of phenyl, alkyl substituted phenyl, alkoxy substituted phenyl, halogen substituted phenyl, and nitrosubstituted phenyl, the substituted radicals being substituted in at least the para position. Preferably aliphatic hydrocarbon radicals of 8–18 carbon atoms come into consideration as higher molecular hydrocarbon radical. The higher molecular hydrocarbon radical may contain substituents such as the hydroxy group, alkoxy and amino groups and halogen atoms or the said radicals may be interrupted by other atoms such as etherlike bound oxygen and sulfur atoms or in the form of amino groups by nitrogen atoms. It may be mentioned that when using the term "higher molecular hydrocarbon radical" in the specification and the appended claims it is intended to include also the said substitution products or the radicals which are interrupted by etherlike bound oxygen or sulfur atoms or in the form of amino groups by nitrogen atoms. The other hydrocarbon radicals substituting the quaternary nitrogen are preferably lower alkyl groups such as methyl, ethyl, propyl, isopropyl, or butyl groups, etc. As regards the bactericidal action those compounds are especially active which contain in the aromatic nucleus of the benzyl group preferably in p-position a substituent selected from the group consisting of alkyl, alkoxy, halogen and nitro.

The ammonium compounds thus obtained are in part crystalline, in part thickly liquid substances which in general dissolve in water. They are practically odorless and relatively non-toxic to man and have proved suitable for the most various preserving and disinfecting purposes. For instance, they may be employed for the disinfection of all kinds of table utensils and storage utensils. They are further advantageously used for disinfecting medical instruments, all articles used in dressing wounds, for disinfecting laundry and so on. Floors and walls may likewise be disinfected by means of the new quaternary ammonium compounds. Also foodstuffs such as fruits, vegetables, meat, etc., may be preserved or disinfected.

The new compounds may also be used in dilution with hard water without diminution of their activity. In the concentration necessary for disinfection they do not injure the skin and therefore may also be used for the disinfection of the skin, particularly the hands. As they are not irritating to mucous membrances which are especially sensitive, they may be added to gargles, tooth pastes and so on for imparting antiseptic properties thereto.

The new quaternary compounds may be used in substance as well as in solution or emulsion or in admixture with each other and/or with other active or inert substances.

The new quaternary ammonium compounds specified above may be prepared according to the methods known per se, for instance, by reacting a halogenacyl amide having linked to the nitrogen atom of the amide group a benzyl radical with a tertiary amine containing a higher molecular hydrocarbon radical. Another way for preparing the new quaternary ammonium compounds consists in treating aminoacyl amides, the amino group of which is in the tertiary state and which contain, linked to the nitrogen atom a benzyl radical with alkylating agents. When the nitrogen atom of the amino group is not substituted by a higher molecular hydrocarbon radical a compound must be chosen for this reaction carrying a higher molecular hydrocarbon radical.

Alternatively, one may start with carboxylic acids, or reactive derivatives thereof, such as esters or halides, carrying a quaternary ammonium group which is substituted by a higher molecular hydrocarbon radical. Carboxylic acids or their reactive derivatives of this kind may be transformed according to the usual methods with the aid of benzyl amines or derivatives thereof into the corresponding acidamide compounds.

A further way of manufacturing the new compounds is to start wtih ammonium acyl amide compounds carrying linked with the nitrogen atom of the ammonium group a higher molecular hydrocarbon radical but having in the acid amide group at least one hydrogen atom. The benzyl radical is then introduced into the acid amide group with the aid of a reactive derivative of the benzyl alcohol, for instance, a halide or arylsulfonic acid ester.

The following examples illustrate my invention without however, restricting it thereto, the parts being by weight.

*Example 1*

197.5 parts of chloroacetyl - benzyl - methyl-amide (colorless liquor having a boiling point of 155° C., obtained from chloroacetyl chloride and benzyl-methyl-amine) are heated with 295 parts of hexadecyl-dimethyl-amine to 100° C. until the reaction begins while stirring. The temperature rises to 120° C. without the application of heat. The substance which is at first in an oily state, turns clear and is crystalline when cool. The (N - benzyl - N - methyl - carbamylmethyl) - hexadecyl - dimethyl - ammonium chloride thus obtained melts after repeated recrystallisation from acetic acid-ethyl ester at 100–105° C. and is easily soluble in water.

The product obtained has the following structural formula:

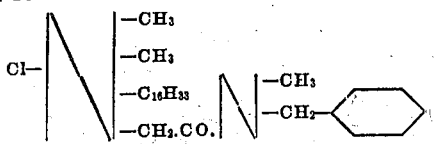

When the hexadecyl-dimethyl-amine is replaced by 213 parts of dimethyl-dodecyl-amine there is obtained (N-benzyl-N-methyl-barbamylmethyl) -dodecyl-dimethyl - ammonium chloride, melting point 50–53° C. By replacing the hexadecyl-dimethyl-amine by 185 parts of decyl-dimethyl-amine there is obtained (N-benzyl-N-methyl-carbamylmethyl) - decyl - dimethyl - ammonium chloride as a crystalline substance.

Example 2

242.5 parts of the reaction product from 4-nitro - benzyl - methyl - amine and chloroacetyl chloride (obtained in benzene solution in the presence of pyridine as a yellow-red oil, boiling point 198–200° C./3 mm.) are heated with 213 parts of dimethyl-dodecylamine to 90–100° C. (N-4-nitrobenzyl-N - methyl - carbamylmethyl)-dodecyl - dimethyl - ammonium chloride may be obtained from the semisolid-reddish-yellow mass, thus obtained.

This product has the following structural formula:

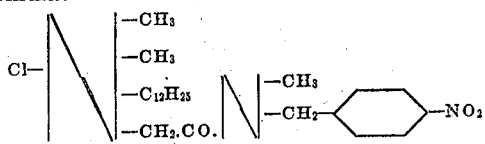

228 parts of the reaction product from 4-nitrobenzyl-amine and chloroacetyl chloride (obtained in benzene solution in the presence of pyridine, melting point 111° C. recrystallized from acetic acid-ethyl ester) are heated to 180° C. with stirring with 295 parts of hexadecyl-dimethyl-amine. The (N-4-nitrobenzyl-N-methyl-carbamylmethyl) - hexadecyl - dimethyl - ammonium chloride thus obtained is easily water-soluble.

Example 3

266.5 parts of the reaction product from 3,4-dichloro-benzyl-methyl-amine (colorless liquor having the boiling point 127° C./10 mm.) and chloroacetyl chloride (thickly liquid, yellowish oil having the boiling point 205–207° C./5 mm.) are heated to 80° C. with stirring together with 213 parts of dodecyl-dimethyl-amine. The temperature rises to 105–110° C. without external application of heat. The reaction mixture turns clear and crystallizes when cool. When recrystallized from acetone the (3-4-dichlorobenzyl-N-methyl-carbamylmethyl) - dodecyl-dimethyl-ammonium chloride melting point 158–160° C., is obtained. The corresponding octodecyl compound melts at 152–154° C.

The reaction product has the following structural formula:

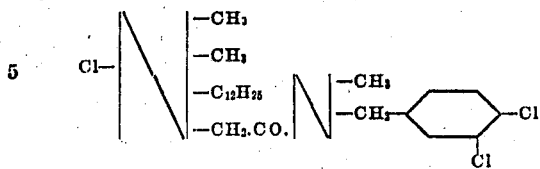

Example 4

197.5 parts of chloroacetyl - benzyl - methyl-amide and 162 parts of a mixture of tertiary amines of the formula $$(H_3C)_2NC_8H_{17}—C_{18}H_{37}$$

yield when added in the manner described in Examples 1–3 a semi-solid oil, easily soluble in water. It contains the different (N-benzyl-N-methyl-carbamylmethyl) -higher alkyl-dimethyl-ammonium chlorides.

These products are represented by the following structural formula:

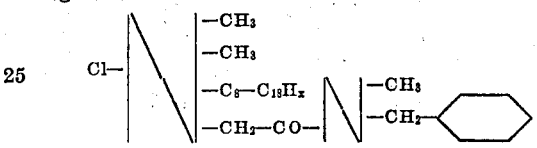

Example 5

183.5 parts of chloroacetic acid-benzyl-amide (obtained from chloroacetyl chloride and benzyl-amine in benzene solution in the presence of pyridine, colorless crystals having the melting point 193–195° C. recrystallized from methyl alcohol) are heated in an autoclave for 3–4 hours to 150–160° C. with the excess of alcoholic dimethyl-amine solution. When recrystallized with hydrochloric acid the solution is evaporated, the residue dissolved in water and potassium carbonate solution added. The dimethyl - amino - acetic acid-benzyl-amide thus obtained is separated as colorless weakly basic smelling oil, boiling point 150–155° C./4 mm. 192 parts of this compound are heated with 294 parts of dodecyl bromide on a water bath and the addition product obtained is recrystallized from acetone. The (N-benzyl-N-methyl-carbamylmethyl) - dodecyl - dimethyl-ammonium bromide melts at 95–96° C.

This quaternary ammonium compound has the following structural formula:

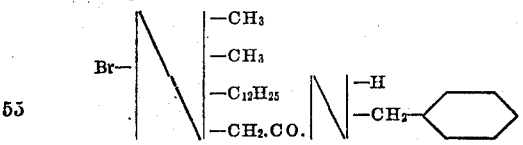

Example 6

211.5 parts of the reaction product from benzyl-methyl-amine and β-chloropropionic acid chloride (obtained in benzene solution in the presence of pyridine, easily movable oil, boiling point 156–160° C./3-4 mm.) are heated to 100° C. with 213 parts of dimethyl-dodecylamine. The [β-(N-benzyl-N-methyl-carbamyl) - ethyl-]-dodecyl-dimethyl-ammonium chloride is obtained as tallow-like mass of the melting point 150–160° C. (not sharp). It shows a good solubility in water.

Example 7

143 parts of the reaction product from 4-chlorobenzyl-amine (boiling point 95–96° C./9 mm.) and chloroacetyl-chloride (brilliant leaves having the melting point 113–115° C. recrystallized from methyl-alcohol) are reacted with 150 parts of dodecyl-dimethyl-amine on the water bath. (N-4 - chloro - benzyl - carbamylmethyl)-dodecyl-dimethyl-ammonium chloride thus obtained melts when recrystallized from acetone, at 127–128° C.

When using the reaction product from 4-methyl-benzyl-methyl-amine (boiling point 88–91° C./11–12 mm.) and chloroacetyl chloride and dodecyl - dimethyl - amine the (N - 4 - methyl-benzyl-N-methyl-carbamylmethyl) - dodecyl - dimethyl-ammonium chloride is obtained in crystals, which melts between 60 and 80° C., but does not melt sharply. In a corresponding manner the (N-4-methoxy-benzyl-N-methyl - carbamyl-methyl) -dodecyl-dimethyl - ammonium chloride may be prepared.

*Example 8*

315 parts of the mixture of bromides, obtained by reducing the natural occurring chaulmoogric acid to the alcohols and subsequently brominating the alcohols in known manner, and 192 parts of dimethyl - amino - acetic acid benzyl - amide are heated together on the water bath. The reaction mass, thus obtained, which is somewhat brownish colored, represents a mixture of the (N-benzyl-carbamyl-methyl) - chaulmoogryl - dimethyl-ammonium bromides and is soluble in water.

I claim:

1. A quaternary ammonium compound having the formula:

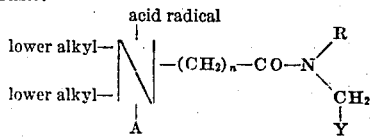

where A is a higher molecular aliphatic hydrocarbon radical having 8–18 carbon atoms, $n$ is one of the integers 1 and 2, R is a member of the class consisting of hydrogen and lower alkyl, and Y is a radical selected from the class consisting of phenyl, alkyl substituted phenyl, alkoxy substituted phenyl, halogen substituted phenyl, and nitro substituted phenyl, the substituted radicals being substituted in at least the para position.

2. A quaternary ammonium compound having the formula:

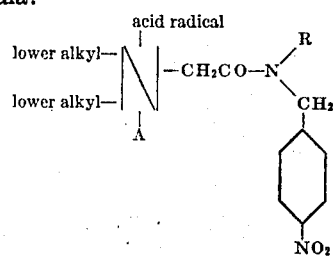

where A is a higher molecular aliphatic hydrocarbon radical having 8–18 carbon atoms and R is a member of the class consisting of hydrogen and lower alkyl.

3. A quaternary ammonium compound having the formula:

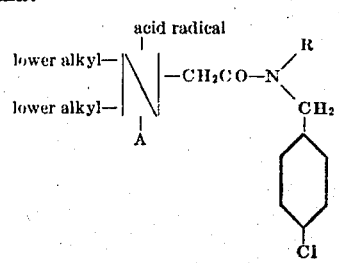

where A is a higher molecular aliphatic hydrocarbon radical having 8–18 carbon atoms, and R is a member of the class consisting of hydrogen and lower alkyl.

4. A quaternary ammonium compound having the formula:

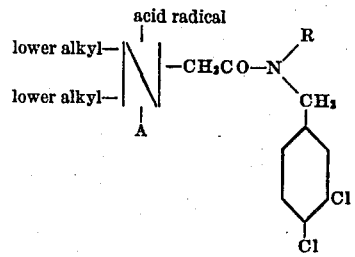

where A is a higher molecular aliphatic hydrocarbon radical having 8–18 carbon atoms, and R is a member of the class consisting of hydrogen and lower alkyl.

5. A quaternary ammonium compound having the formula:

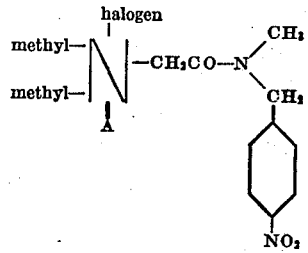

where A is a higher molecular aliphatic hydrocarbon radical having 8–18 carbon atoms.

6. A quaternary ammonium compound having the formula:

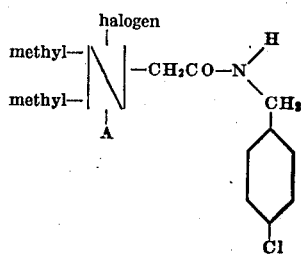

where A is a higher molecular aliphatic hydrocarbon radical having 8–18 carbon atoms.

7. A quaternary ammonium compound having the formula:

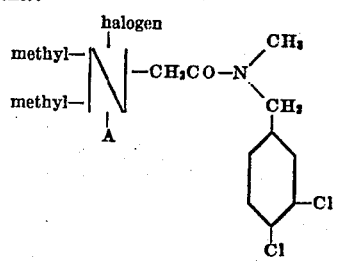

where A is a higher molecular aliphatic hydrocarbon radical having 8–18 carbon atoms.

FRIEDRICH LEUCHS.